(12) United States Patent
Bartlett

(10) Patent No.: US 9,729,504 B2
(45) Date of Patent: Aug. 8, 2017

(54) METHOD OF NEAR REAL-TIME AUTOMATED GLOBAL GEOGRAPHICAL IP ADDRESS DISCOVERY AND LOOKUP BY EXECUTING COMPUTER-EXECUTABLE INSTRUCTIONS STORED ON A NON-TRANSITORY COMPUTER-READABLE MEDIUM

(71) Applicant: Robert Michael Norman Bartlett, West Kelowna, CA (US)

(72) Inventor: Robert Michael Norman Bartlett, West Kelowna, CA (US)

(73) Assignee: AAA INTERNET PUBLISHING INC., West Kelowna (CA)

( * ) Notice: Subject to any disclaimer, the term of this patent is extended or adjusted under 35 U.S.C. 154(b) by 252 days.

(21) Appl. No.: 14/812,968

(22) Filed: Jul. 29, 2015

(65) Prior Publication Data

US 2016/0036777 A1 Feb. 4, 2016

Related U.S. Application Data

(60) Provisional application No. 62/030,384, filed on Jul. 29, 2014.

(51) Int. Cl.
*H04L 29/12* (2006.01)
*H04L 12/26* (2006.01)
*H04L 12/24* (2006.01)

(52) U.S. Cl.
CPC ............ *H04L 61/609* (2013.01); *H04L 41/12* (2013.01); *H04L 43/10* (2013.01); *H04L 61/1552* (2013.01); *H04L 43/0864* (2013.01); *H04L 43/16* (2013.01); *H04L 61/1511* (2013.01)

(58) Field of Classification Search
CPC ....... H04L 61/609; H04L 41/12; H04L 67/18; H04L 61/1511; H04L 29/12066; H04L 43/10; H04L 43/16; H04L 43/0864; H04L 29/12981; H04W 64/00; G06F 17/30241
See application file for complete search history.

(56) References Cited

U.S. PATENT DOCUMENTS

| 7,711,846 | B2* | 5/2010 | Padmanabhan | H04L 45/04 709/238 |
| 7,937,336 | B1* | 5/2011 | Maynard-Zhang | H04L 29/1299 706/12 |
| 8,131,834 | B1* | 3/2012 | Augart | H04L 41/12 709/223 |
| 8,239,510 | B2* | 8/2012 | Houri | H04L 29/06 709/223 |

(Continued)

*Primary Examiner* — Thomas Dailey
*Assistant Examiner* — Abderrahmen Chouat

(57) ABSTRACT

A method of near real-time global geographical IP address automated lookup utilizes an automated system continually performing a plurality of IP address location discovery techniques including traceroute automation, global server triangulation other geo IP discovery techniques and rolling cross checks across the system to build and maintain a global geo IP database with known geo locations of IP addresses. The geo IP database may be utilized to request the geo location of a specific IP address, and if the geo location of the specific IP address is unknown the system attempts to acquire the geo location of the specific IP address using the IP address location discovery techniques.

17 Claims, 8 Drawing Sheets

(56) References Cited

U.S. PATENT DOCUMENTS

| | | | | |
|---|---|---|---|---|
| 8,683,609 | B2* | 3/2014 | Bravo | G06F 21/35 |
| | | | | 380/258 |
| 8,788,664 | B2* | 7/2014 | Guo | G06F 17/30241 |
| | | | | 709/225 |
| 9,026,145 | B1* | 5/2015 | Duleba | H04L 61/25 |
| | | | | 455/456.3 |
| 2005/0108213 | A1* | 5/2005 | Riise | G06F 17/3087 |
| 2005/0234922 | A1* | 10/2005 | Parekh | G06F 17/30241 |
| 2008/0125077 | A1* | 5/2008 | Velazquez | H04L 12/66 |
| | | | | 455/404.2 |

* cited by examiner

METHOD OF NEAR REAL-TIME AUTOMATED GLOBAL GEOGRAPHICAL IP ADDRESS DISCOVERY AND LOOKUP BY EXECUTING COMPUTER-EXECUTABLE INSTRUCTIONS STORED ON A NON-TRANSITORY COMPUTER-READABLE MEDIUM

The current application claims a priority to the U.S. Provisional Patent application Ser. No. 62/030,384 filed on Jul. 29, 2014.

FIELD OF THE INVENTION

The present invention relates generally to Internet protocol technology. More particularly, the present invention relates to a system and method for identifying the geographic location of an Internet protocol address.

BACKGROUND OF THE INVENTION

Geolocation may refer to the practice of assessing the real-world geographic location of an object, or to the actual assessed location. In computing, geolocation software is used to deduce the physical location of another party, typically a mobile phone or Internet-connected computer terminal. For example, on the Internet, one geolocation approach is to identify the subject party's Internet protocol (IP) address and then determine that party's physical location with geographic information (country, city, postal code, organization, etc.) attached to the IP address. Such an approach is utilized by what may be referred to generally as geo IP address lookup systems.

Traditional geo IP address lookup systems use a database lookup to determine the approximate location of an IP address. These systems are only as accurate as the database itself, which is generally built from self-reported or third party data. This may lead to the following problems: First, the third party data is often purposely inaccurate or incomplete. Second, due to privacy or security concerns, the IP address location reported may be inaccurate. Third, the IP address location reported might belong to the central or home office of an organization instead of the actual location of the IP address. Fourth, the location of an IP address may change at any time, making the corresponding database data for that IP address inaccurate.

For those skilled in IP technology, typically there are two methods that are used to estimate the location of an IP address. The first method is to determine IP address locations with traceroutes. A traceroute displays the routes and measures transit delays of packets across an IP network. Often a traceroute to a given IP address is performed, and then a reverse Domain Name System (reverse DNS) for the hops of the traceroute to that IP address can determine the path the data takes, and ultimately the true location of the IP address. A challenge with this method is that the reverse DNS can be blank or hidden.

The second method is to determine IP address locations by ping, which tests the reachability of a host on an IP network and measures the round-trip time for messages sent from the originating host to a destination computer. It can be very challenging to produce accurate results using this method. If a web server is situated at a known location, and an IP address from the web server is pinged, the value, or score, of the ping can provide an estimate for the IP address location. As the ping score increases, the accuracy of the location greatly diminishes. For example, with a 1 millisecond ping, the IP address is likely in the same data center. At 10 milliseconds, it is probably in the same city. At 100 milliseconds, it could potentially be across the country. What makes this even more challenging is that a high ping score does not necessarily indicate that the IP address is physically far away. Poor connectivity between the test server and the target server may result in wildly inaccurate results.

Another significant challenge with IP address location discovery is obfuscation. Often companies or Internet providers will use obfuscation techniques to hide locations of IP addresses, or report completely different locations and/or trace information. These obfuscation techniques are deliberately designed to mislead someone skilled in IP technology. Obfuscation techniques may also completely alter the apparent location of a given IP address at any time. This makes it very difficult for an IP technologist to accurately determine the true location of an IP address protected by obfuscation.

What is needed is an accurate, near real-time global server/node system that performs automated IP address location discovery and cross checks, acting like a global army of IP technologists working twenty-four-seven. This system is particularly helpful when IP obfuscation techniques are used, which would otherwise report errant data to someone skilled in the art of IP technology.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a method of near real-time global geographical internet protocol (IP) address automated lookup that performs continual automated IP address geographical location (geo location) discovery and cross checks. The present invention can essentially fulfill the tasks of a global army of IP technologists working around the clock. The present invention makes use of a global lookup network (GLN) comprising a plurality of GLN servers in various geo locations for granularity. Ideally, the GLN will have servers available at every major center around the world to enhance accuracy. The geo location of each of the GLN servers is known and the GLN is thus used as a starting point for discovering new IP address locations. The GLN may also be known as a global private network or GPN.

Figure 1:
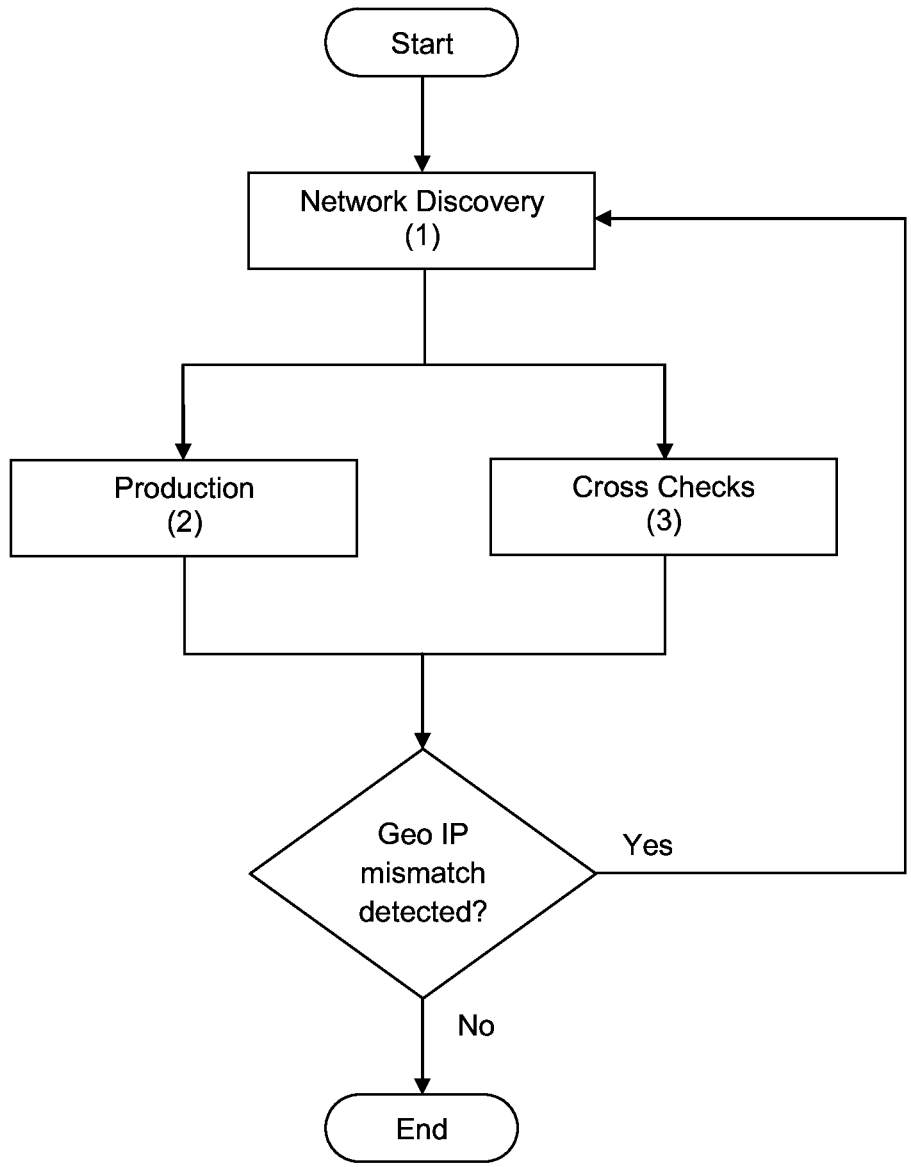
FIG. 1 is a stepwise flow diagram illustrating an exemplary process flow of the three stages utilized by the present invention.
Figure 2:
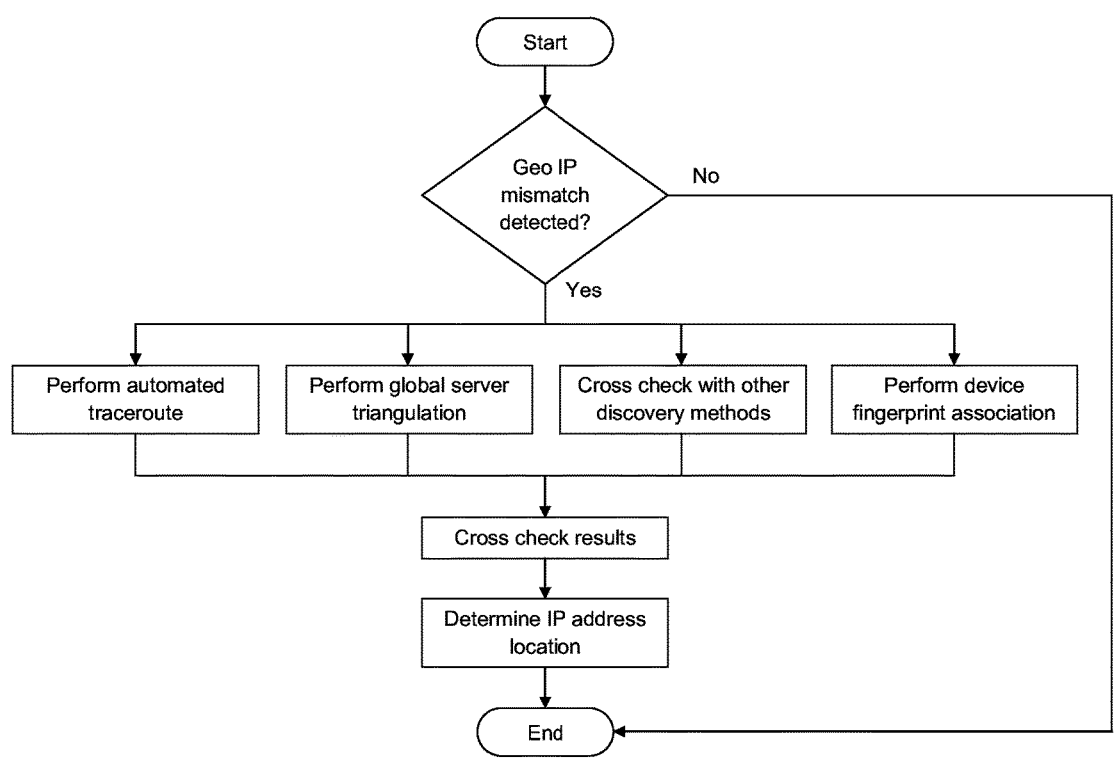
FIG. 2 is a stepwise flow diagram illustrating an exemplary process flow of IP address location discovery methods utilized by the present invention.

With reference to FIG. 1, the present invention operates in three main stages: (1) network discovery, (2) production, and (3) cross checks. Network discovery (1) involves discovering IP address locations using methods well known by professionals skilled in IP technology, and adding these locations to a near real-time geo IP database. Production (2) involves using the geo IP database populated by (1) to complete real-time lookups of IP addresses. While doing (2), periodic rolling cross checks (3) are made across the system to ensure accuracy of the near real-time geo IP database. If a problem is found (e.g., if the location of an IP address has changed), (1) can be completed again to automatically reclassify an IP address and ensure the ongoing accuracy of the geo IP database. As illustrated in FIG. 2, the discovery methods may be performed concurrently and the IP address location results from each method may be cross checked with the results from each of the other methods in order to determine the most accurate location of the IP address.

Figure 3:
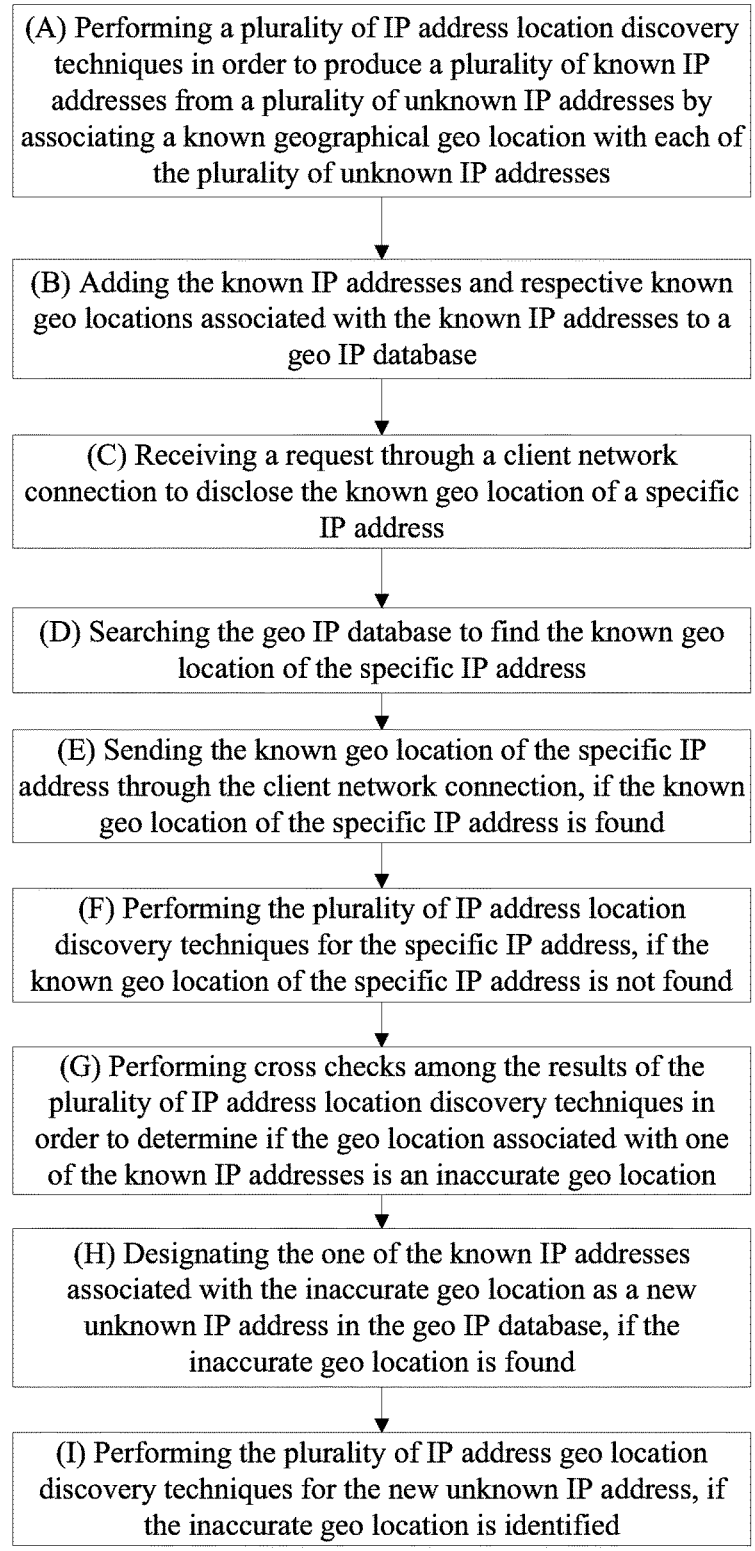
FIG. 3 is a stepwise flow diagram describing the general method of the present invention.

Referring to FIG. 3, in the network discovery stage of the present invention, a plurality of IP address location discovery techniques are performed in order to produce a plurality of known IP addresses from a plurality of unknown IP addresses by associating a known geo location with each of the unknown IP addresses, or as many as possible. The unknown IP addresses do not have an associated known geo location, and the primary purpose of the present invention is to discover a known geo location for as many unknown IP addresses as possible. Each of the IP address location discovery techniques, when successful, produces known geo locations as results to be associated with the unknown IP addresses. The known IP addresses and respective known geo locations associated with the known IP addresses are then added to a geo IP database.

In the production stage, performing real-time lookup of the geo locations of IP addresses involves receiving a request through a client network connection (associated with a client computing device) to disclose the known geo location of a specific IP address. The geo IP database is searched to find the known geo location of the specific IP address. If the specific IP address is found to be a known IP address in the geo IP database, the known geo location of the specific IP address through the client network connection. If the specific IP address is an unknown IP address and does not have a known geo location in the geo IP database, the plurality of IP address location discovery techniques are again performed for the specific IP address in an attempt to discover the geo location of the specific IP address.

The third chief stage of the present invention is performing cross checks to determine and maintain accuracy of the geo IP database. Cross checks are performed among the results of each of the plurality of IP address location discovery techniques in order to determine if the geo location associated with one or more of the known IP addresses is an inaccurate geo location. If an inaccurate geo location is found to be associated with one of the plurality of known IP addresses, the one of the plurality of known IP addresses is designated as a new unknown IP address in the geo IP database. Subsequently, in order to rectify this inaccuracy, the plurality of IP address geo location discovery techniques are again performed for the new unknown IP address if the inaccurate geo location is identified.

Figure 4:
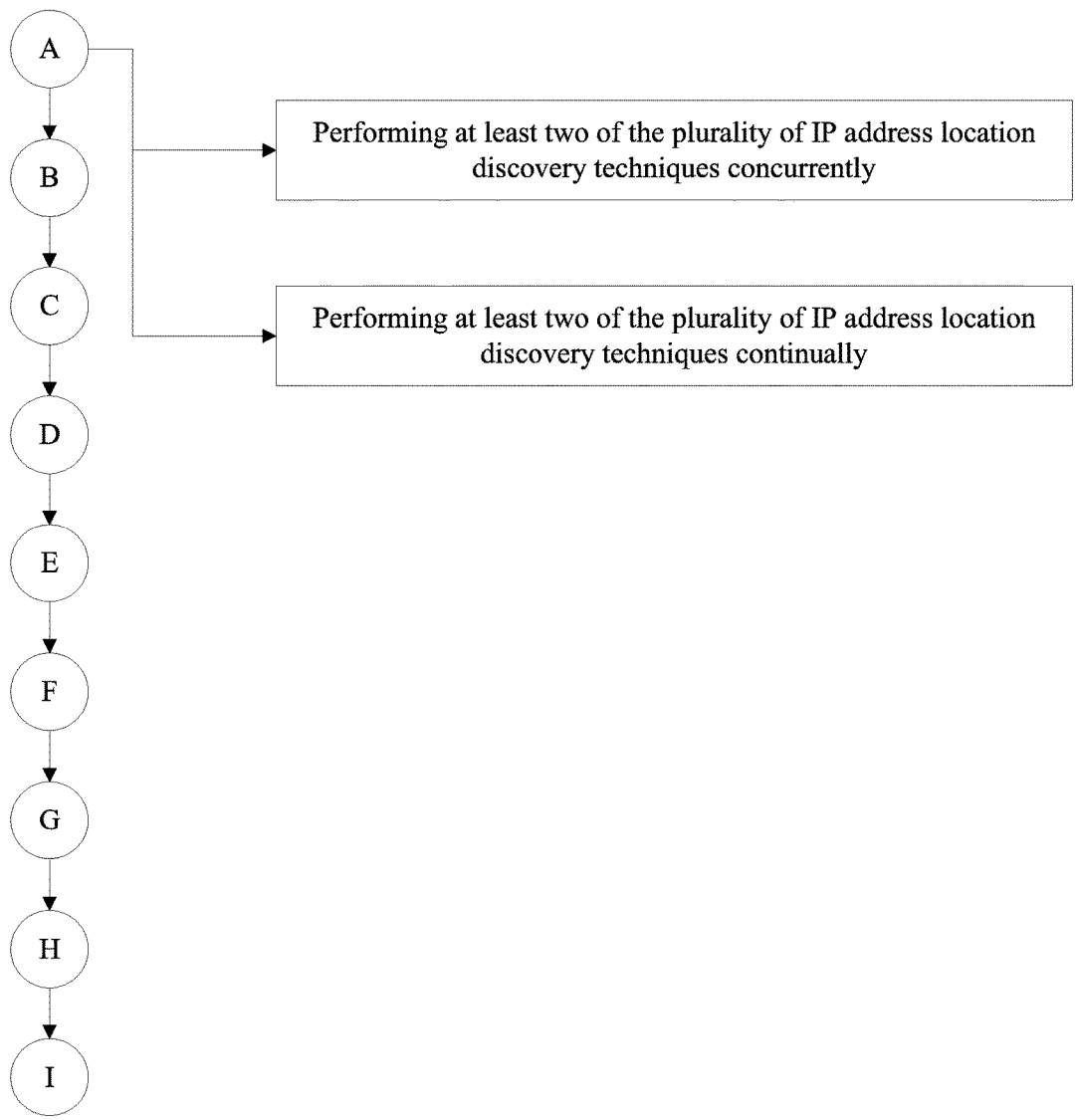
FIG. 4 is a stepwise flow diagram describing additional steps in the method of the present invention for concurrently and continually performing the IP address location discovery techniques.

As shown in FIG. 4, in the preferred embodiment of the present invention, at least two of the plurality of IP address location discovery techniques are performed concurrently, though even more preferably all of the plurality of IP address location discovery techniques are performed concurrently. Similarly, at least two of the plurality of IP address location discovery techniques may be performed continually, though in the preferred embodiment all of the plurality of IP address location discovery techniques are performed continually, where applicable.

The plurality of IP address location discovery techniques include traceroute automation, global server triangulation, cross checks with other IP address location discovery techniques, and IP address association by computing device fingerprint.

Figure 5:
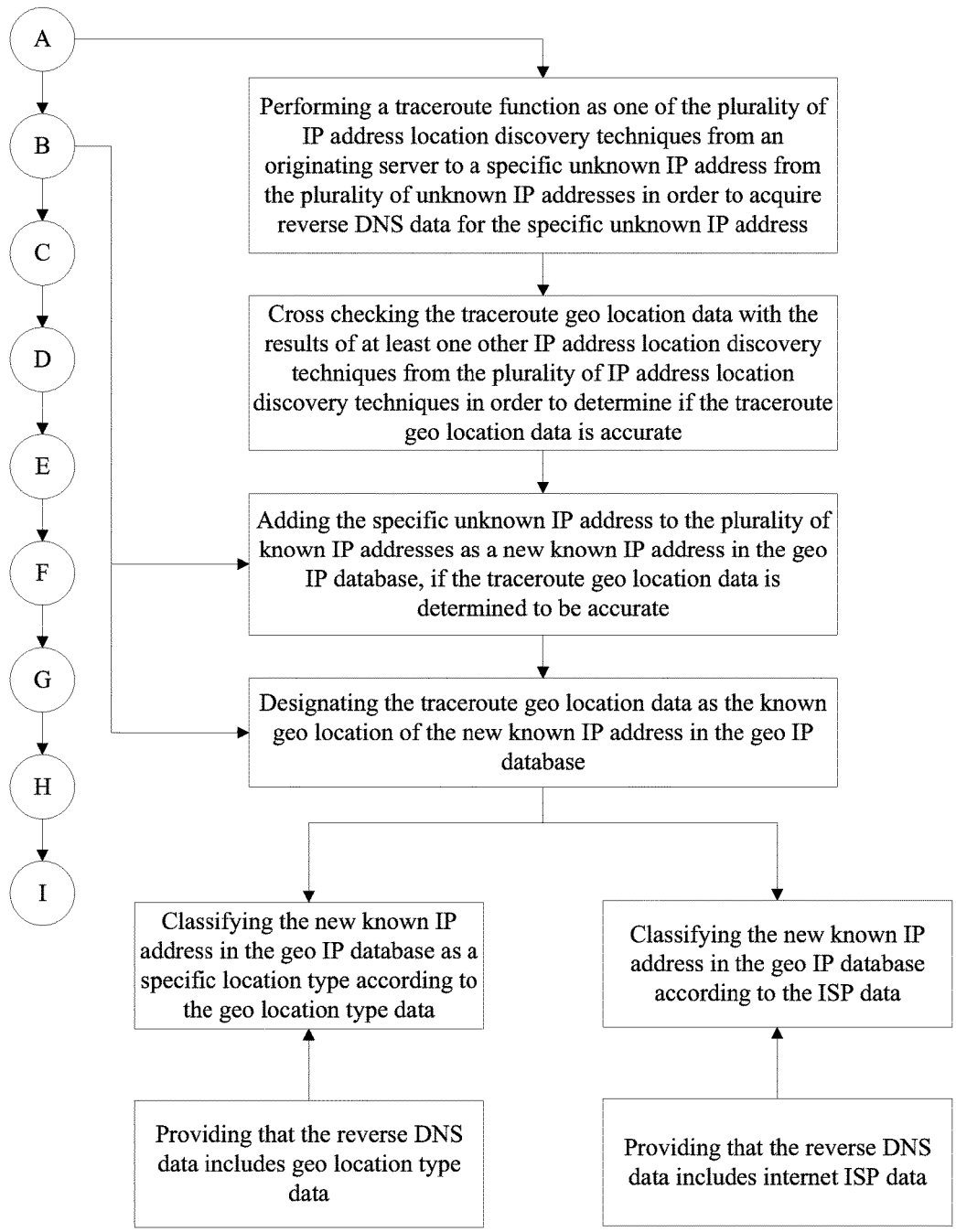
FIG. 5 is a stepwise flow diagram describing steps in the method of the present invention for utilizing a traceroute function to discover the geo location of an unknown IP address.

The first method is to build a database of reverse DNS addresses and known prefixes that represent locations. As illustrated in FIG. 5, a traceroute to an IP address will be completed and the location will be reported based on the results of the automated database query of the reverse DNS. In using traceroute automation as one of the plurality of IP address location discovery techniques, a traceroute function is performed from an originating server to a specific unknown IP address from the plurality of unknown IP addresses in order to acquire reverse DNS data for the specific unknown IP address, wherein the reverse DNS data is a result of the traceroute function, and wherein the reverse DNS data includes traceroute geo location data. In the preferred embodiment, the originating server is part of a network of servers associated with the operator of the present invention, in particular the GLN.

The traceroute geo data is cross checked with the results of at least one other IP address location discovery techniques from the plurality of IP address location discovery techniques in order to determine if the traceroute geo location data is accurate. If the traceroute geo location data is determined to be accurate, the specific unknown IP address is added to the plurality of known IP addresses as a new known IP address in the geo IP database and the traceroute geo location is designated as the known geo location of the new known IP address in the geo IP database.

In the preferred embodiment of the present invention, the reverse DNS data includes geo location type data and internet service provider (ISP) data. The new known IP address is classified in the geo IP database as a specific location type according to the geo location type data, in addition to being classified according to the ISP data. The ISP data in particular helps in determining if the geo location of the new known IP address can be classified as residential, at a school, from a business, at an airport, or used over public Wi-Fi.

The traceroute automation function is preferably continually and consecutively performed for a wide range of unknown IP addresses. An algorithm for progressing through the unknown IP addresses may be utilized, such as, but not limited to, starting in a particular geographic region and progressing outwards in a radius, or progressing sequentially through a list, or another method.

While useful, the traceroute automation method by itself is not always enough to verify an IP address location due to potentially inaccurate or missing data. A cross check using global server triangulation is required.

Figure 6:
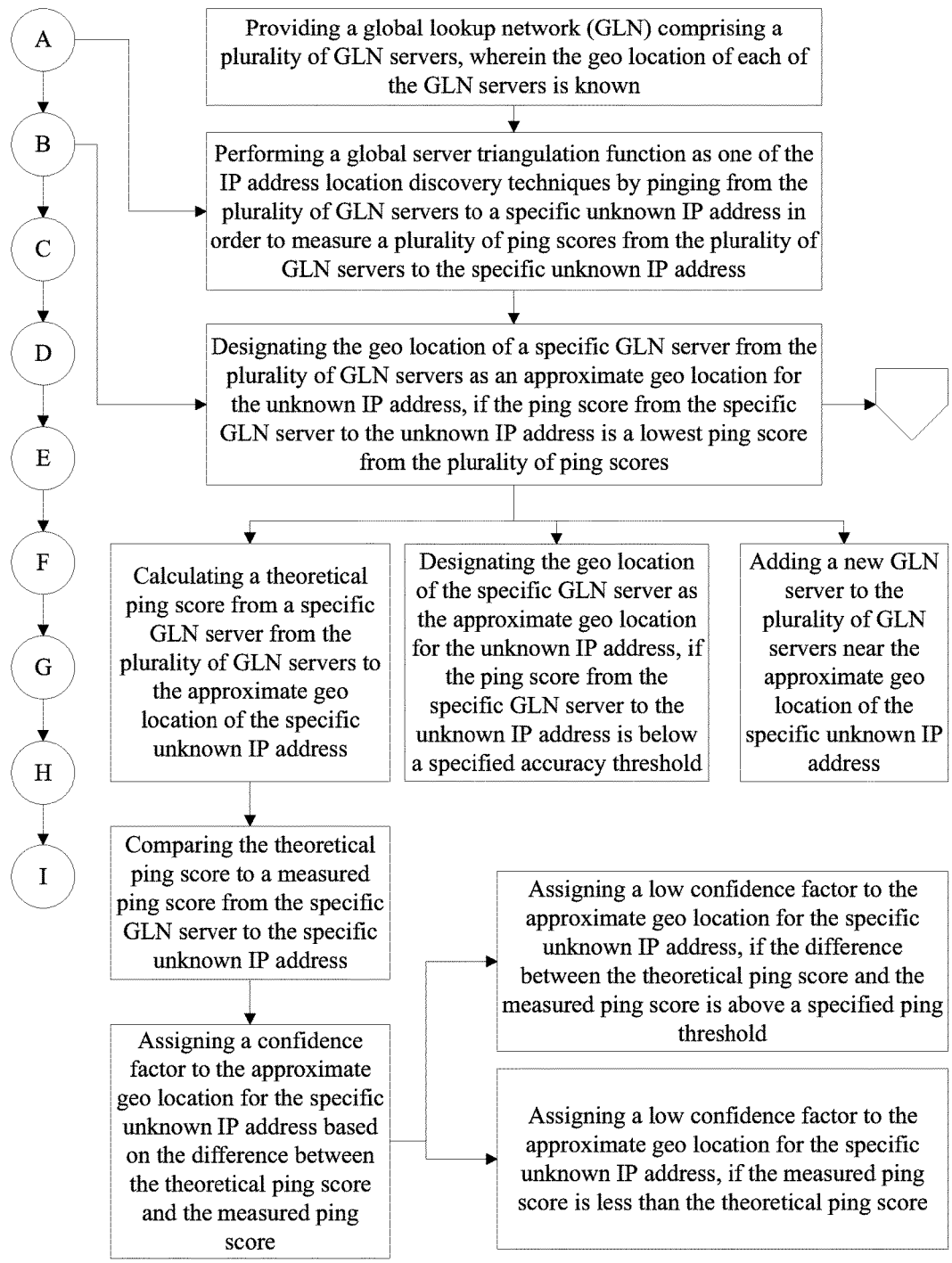
FIG. 6 is a stepwise flow diagram describing steps in the method of the present invention for utilizing global server triangulation to discover the geo location of a specific unknown IP address and assessing the accuracy of the results.

Referring to FIG. 6, another of the IP address location discovery techniques is global server triangulation. Using a large GLN where the geo location of the GLN servers is already known, the location of an IP address can be determined with triangulation to the GLN. By measuring the ping to a known web server, the location of that IP address can be determined with a high degree of accuracy if the ping score is low, and accuracy decreasing as the ping score increases. The global server triangulation is performed with an automated system. Logic may be integrated to minimize the total pings required to determine the final location for a new IP address.

In particular, a specific unknown IP address is pinged from the plurality of GLN servers in order to measure a plurality of ping scores from the plurality of GLN servers to the specific unknown IP address. The object of global server triangulation is to find the geo location of the specific unknown IP address by a lowest ping score from the plurality of ping scores. The geo location of a specific GLN server with the lowest ping score is designated as an approximate geo location for the specific unknown IP address. The approximate geo location is the result of the global server triangulation function and may be assigned an accuracy rating or confidence value depending on the value of the lowest ping score, among other factors.

In one embodiment, the ping score from the specific GLN server to the specific unknown IP address must be below a specified accuracy threshold in order to be considered a valid result, regardless of whether the ping score from the specific GLN server to the specific unknown IP address is the lowest ping score from the plurality of GLN servers to the specific unknown IP address. If the ping score from the specific GLN server to the specific unknown IP address is the lowest ping score, and is below a specified accuracy threshold, the geo location of the specific GLN server is designated as the approximate geo location for the specific unknown IP address, and the specific unknown IP address is designated as a new known IP address in the geo IP database. Additionally, in order to increase accuracy and granularity of the GLN and the method of the present invention, a new GLN server may be added to the plurality of GLN servers near the approximate geo location of the specific unknown IP address.

In the preferred embodiment, a theoretical ping score is calculated from a specific GLN server from the plurality of GLN servers to the approximate geo location of the specific unknown IP address. Given the speed of light in a fiber optic cable and the physical distance between the geo location of the specific GLN server to the approximate geo location of the specific unknown IP address, it is possible to calculate a the theoretical ping score for comparison to a measured ping score from the specific GLN server to the specific unknown IP address. The theoretical ping score is compared to the measured ping score, and a confidence factor is assigned to the approximate geo location for the specific unknown IP address based on the difference between the theoretical ping score and the measured ping score.

If the difference between the theoretical ping score and the measured ping score is above a certain threshold, a low confidence factor is assigned to the approximate geo location for the specific unknown IP address. Additionally, if the measured ping score is less than the theoretical ping score, a low confidence factor is assigned to the approximate geo location for the specific unknown IP address. The calculated theoretical ping score is a minimum, and any value below the theoretical ping score is not possible. Therefore, the measured ping score being less than the theoretical ping score is a clear indication that obfuscation techniques are being used with the specific unknown IP address.

It should be noted that theoretical ping score calculation process and the round trip time comparison process may be applied to both the traceroute automation process and the global server triangulation process, as well as any other relevant IP discovery or cross check process.

Figure 7:
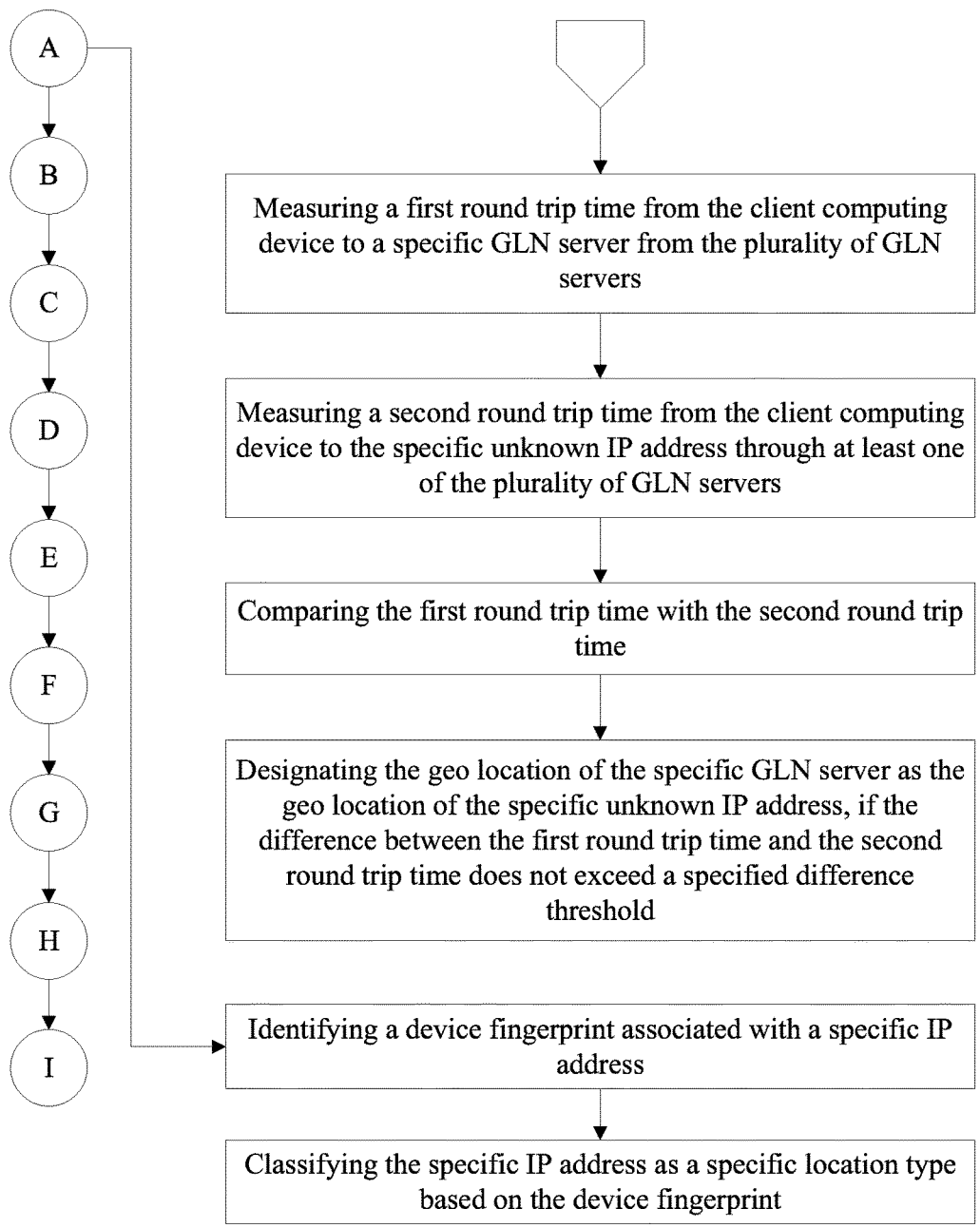
FIG. 7 is a stepwise flow diagram describing steps in the method of the present invention for comparing round trip times in order to discover or check the accuracy of the geo location of an unknown IP address.

As shown in FIG. 7, an additional accuracy check and cross check that may be utilized is a round trip time comparison. A first round trip time is measured from the client computing device to a specific GLN server from the plurality of GLN servers. A second round trip time is measured from the client computing device through at least one of the plurality of GLN servers to the specific unknown IP address. Data measured for the second round trip time is sent from the client computing device and must go through the at least one of the plurality of GLN servers to the specific unknown IP address in order to ensure geo location accuracy. The first round trip time and the second round trip time are then compared. If the difference between the first round trip time and the second round trip time does not exceed a specified difference threshold, it is more likely the geo locations of the specific GLN server and the specific unknown IP address are the same or similar. The geo location of the specific unknown IP address may then be designated as the geo location of the specific unknown IP address. Alternatively, the round trip time comparison process may simply be used as a cross check to supplement the accuracy of another IP address location discovery method.

Another aspect of the present invention shown in FIG. 7 is identifying a device fingerprint associated with a specific IP address, wherein the device fingerprint is unique to a specific computing device. The specific IP address is classifies as belonging to a specific location type based on the device fingerprint. This is particularly useful in identifying and classifying IP addresses of devices in a single location with a large number of computing devices, such as but not limited to a datacenter, a school, a library, or another such location.

Figure 8:
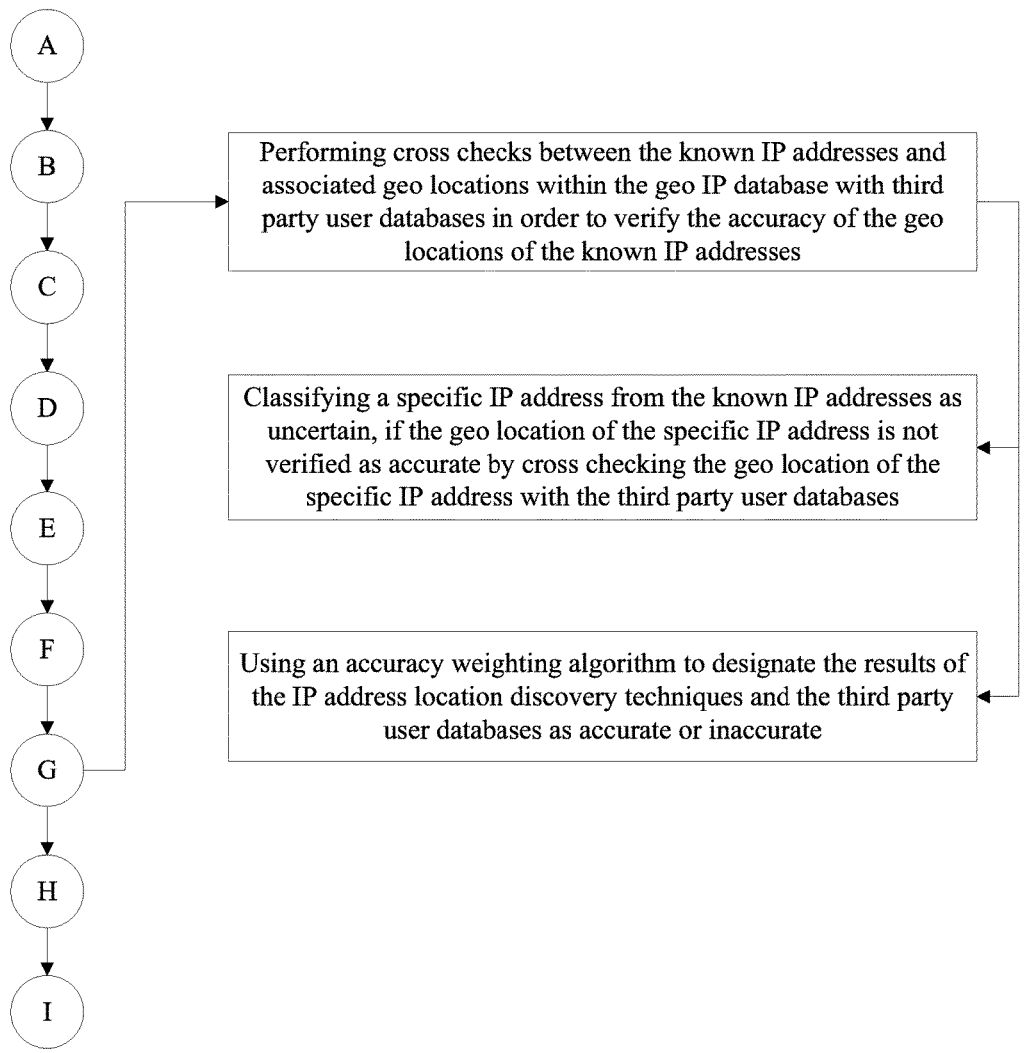
FIG. 8 is a stepwise flow diagram describing additional steps in the method of the present invention for determining the accuracy of geo locations for known IP addresses.

Finally, as shown in FIG. 8, rolling cross checks are performed among each of the IP address location discovery techniques to ensure accuracy and consistency. Primarily, cross checks are performed among the results of the plurality of IP address location discovery techniques, and accuracy determination methods such as those disclosed above are used as well. Another type of cross checks that are performed are between the known IP addresses and associated geo locations within the geo IP database with third party databases in order to verify the accuracy of the geo locations of the known IP addresses. For example, the geo IP database may be synced and cross checked with major consumer online user databases where IP address information is known. This syncing would allow IP addresses to be associated with postal codes, for example. The intelligence/systems from trace automation and global server triangulation would be used to cross check and validate the IP address details. Additional cross checks could be made via GPS, cell towers, BGP tables, Wi-Fi hotspots, Internet registry databases (ARIN, RIPE, APNIC, etc.) or routing asset databases (RADb, etc.). An intelligent weighting system would be used to accurately identify the location and additional knowledge about an IP address, given all information sources.

Each type of cross check may classify or designate entries in the geo IP database as uncertain or inaccurate based on the nature of comparisons. If the geo location of a specific IP address is not verified as accurate by cross checking the geo location of the specific IP address with the third party user databases and/or with the results of the other IP address location discovery techniques, the specific IP address may be classified as uncertain.

Some IP address location discovery techniques may be regarded as more valid and hold more weight than others, or an accuracy weighing algorithm may be utilized to designate the results of the IP address location discovery techniques and the third party user databases as accurate or inaccurate.

IP obfuscation techniques have the potential to significantly spoil network discovery results at any given time. Due to the distributed nature of the GLN, the system acts like an army of intelligent IP technologists, sharing real-time information and working together to determine the true location of an IP address. Depending on the obfuscation technique(s) being used, an IP address can be properly classified by the GLN, wherein the GLN indicates the obfuscation method(s) being used and the true geo location of the IP address. This level of granularity and accuracy is only possible with the GLN.

To ensure the integrity/security of the system and accuracy of the near real-time geo IP database, IP address geolocation lookups will be accessible online only. IP address geolocation lookups will be done using a distributed server system to ensure scalability and redundancy.

The described system provides a superior global geo IP address lookup system with extreme accuracy, taking the brainpower of a global army of IT techs, working together in real-time to create a fully automated and intelligent near real-time IP address lookup system.

Although the invention has been explained in relation to its preferred embodiment, it is to be understood that many other possible modifications and variations can be made without departing from the spirit and scope of the invention as hereinafter claimed.

What is claimed is:

1. A method of near real-time automated global geographical IP address discovery and lookup by executing computer-executable instructions stored on a non-transitory computer-readable medium comprises the steps of:
    performing a plurality of internet protocol (IP) address location discovery techniques in order to produce a plurality of known IP addresses from a plurality of unknown IP addresses by associating a known geographical location (geo location) with each of the plurality of unknown IP addresses, wherein the unknown IP addresses do not have an associated known geo location, and wherein the IP address location discovery techniques produce known geo locations as results to be associated with the unknown IP addresses;
    adding the known IP addresses and respective known geo locations associated with the known IP addresses to a geo IP database;
    receiving a request through a client network connection to disclose the known geo location of a specific IP address, wherein the client network connection is associated with a client computing device;
    searching the geo IP database to find the known geo location of the specific IP address;
    sending the known geo location of the specific IP address through the client network connection, if the known geo location of the specific IP address is found;
    performing the plurality of IP address location discovery techniques for the specific IP address, if the known geo location of the specific IP address is not found;
    performing cross checks among the results of the plurality of IP address location discovery techniques in order to determine if the geo location associated with one of the known IP addresses is an inaccurate geo location;
    designating the one of the known IP addresses associated with the inaccurate geo location as a new unknown IP address in the geo IP database, if the inaccurate geo location is found; and
    performing the plurality of IP address geo location discovery techniques for the new unknown IP address, if the inaccurate geo location is identified.

2. The method of near real-time automated global geographical IP address discovery and lookup by executing computer-executable instructions stored on a non-transitory computer-readable medium as claimed in claim 1 comprises the step of:
    performing at least two of the plurality of IP address location discovery techniques concurrently.

3. The method of near real-time automated global geographical IP address discovery and lookup by executing computer-executable instructions stored on a non-transitory computer-readable medium as claimed in claim 1 comprises the step of:
    performing at least two of the plurality of IP address location discovery techniques continually.

4. The method of near real-time global geographical IP address automated lookup by executing computer-executable instructions stored on a non-transitory computer-readable medium as claimed in claim 1 comprises the steps of:
    performing a traceroute function as one of the plurality of IP address location discovery techniques from an originating server to a specific unknown IP address from the plurality of unknown IP addresses in order to acquire reverse DNS data for the specific unknown IP address, wherein the reverse DNS data is a result of the traceroute function, and wherein the reverse DNS data includes traceroute geo location data;
    cross checking the traceroute geo location data with the results of at least one other IP address location discovery techniques from the plurality of IP address location discovery techniques in order to determine if the traceroute geo location data is accurate;
    adding the specific unknown IP address to the plurality of known IP addresses as a new known IP address in the geo IP database, if the traceroute geo location data is determined to be accurate; and
    designating the traceroute geo location data as the known geo location of the new known IP address in the geo IP database.

5. The method of near real-time global geographical IP address automated lookup by executing computer-executable instructions stored on a non-transitory computer-readable medium as claimed in claim 4 comprises the step of:
    providing that the reverse DNS data includes geo location type data;
    classifying the new known IP address in the geo IP database as a specific location type according to the geo location type data.

6. The method of near real-time global geographical IP address automated lookup by executing computer-executable instructions stored on a non-transitory computer-readable medium as claimed in claim 4 comprises the step of:
 providing that the reverse DNS data includes internet service provider (ISP) data;
 classifying the new known IP address in the geo IP database according to the ISP data.

7. The method of near real-time global geographical IP address automated lookup by executing computer-executable instructions stored on a non-transitory computer-readable medium as claimed in claim 1 comprises the steps of:
 providing a global lookup network (GLN) comprising a plurality of GLN servers, wherein the geo location of each of the GLN servers is known;
 performing a global server triangulation function as one of the IP address location discovery techniques by pinging from the plurality of GLN servers to a specific unknown IP address in order to measure a plurality of ping scores from the plurality of GLN servers to the specific unknown IP address; and
 designating the geo location of a specific GLN server from the plurality of GLN servers as an approximate geo location for the unknown IP address, if the ping score from the specific GLN server to the unknown IP address is a lowest ping score from the plurality of ping scores, wherein the approximate geo location is the result of the global server triangulation function.

8. The method of near real-time global geographical IP address automated lookup by executing computer-executable instructions stored on a non-transitory computer-readable medium as claimed in claim 7 comprises the step of:
 designating the geo location of the specific GLN server as the approximate geo location for the unknown IP address, if the ping score from the specific GLN server to the unknown IP address is below a specified accuracy threshold.

9. The method of near real-time global geographical IP address automated lookup by executing computer-executable instructions stored on a non-transitory computer-readable medium as claimed in claim 7 comprises the step of:
 adding a new GLN server to the plurality of GLN servers near the approximate geo location of the specific unknown IP address.

10. The method of near real-time global geographical IP address automated lookup by executing computer-executable instructions stored on a non-transitory computer-readable medium as claimed in claim 7 comprises the steps of:
 calculating a theoretical ping score from a specific GLN server from the plurality of GLN servers to the approximate geo location of the specific unknown IP address;
 comparing the theoretical ping score to a measured ping score from the specific GLN server to the specific unknown IP address; and
 assigning a confidence factor to the approximate geo location for the specific unknown IP address based on the difference between the theoretical ping score and the measured ping score.

11. The method of near real-time global geographical IP address automated lookup by executing computer-executable instructions stored on a non-transitory computer-readable medium as claimed in claim 7 comprises the step of:
 assigning a low confidence factor to the approximate geo location for the specific unknown IP address, if the difference between the theoretical ping score and the measured ping score is above a specified ping threshold.

12. The method of near real-time global geographical IP address automated lookup by executing computer-executable instructions stored on a non-transitory computer-readable medium as claimed in claim 7 comprises the step of:
 assigning a low confidence factor to the approximate geo location for the specific unknown IP address, if the measured ping score is less than the theoretical ping score.

13. The method of near real-time global geographical IP address automated lookup by executing computer-executable instructions stored on a non-transitory computer-readable medium as claimed in claim 7 comprises the steps of:
 measuring a first round trip time from the client computing device to a specific GLN server from the plurality of GLN servers;
 measuring a second round trip time from the client computing device to the specific unknown IP address through at least one of the plurality of GLN servers, wherein data measured for the second round trip time is sent from the client computing device through the at least one of the plurality of GLN servers to the specific unknown IP address;
 comparing the first round trip time with the second round trip time; and
 designating the geo location of the specific GLN server as the geo location of the specific unknown IP address, if the difference between the first round trip time and the second round trip time does not exceed a specified difference threshold.

14. The method of near real-time global geographical IP address automated lookup by executing computer-executable instructions stored on a non-transitory computer-readable medium as claimed in claim 1 comprises the step of:
 performing cross checks between the known IP addresses and associated geo locations within the geo IP database with third party user databases in order to verify the accuracy of the geo locations of the known IP addresses.

15. The method of near real-time global geographical IP address automated lookup by executing computer-executable instructions stored on a non-transitory computer-readable medium as claimed in claim 14 comprises the step of:
 classifying a specific IP address from the known IP addresses as uncertain, if the geo location of the specific IP address is not verified as accurate by cross checking the geo location of the specific IP address with the third party user databases.

16. The method of near real-time global geographical IP address automated lookup by executing computer-executable instructions stored on a non-transitory computer-readable medium as claimed in claim 14 comprises the step of:
 using an accuracy weighting algorithm to designate the results of the IP address location discovery techniques and the third party user databases as accurate or inaccurate.

17. The method of near real-time global geographical IP address automated lookup by executing computer-executable instructions stored on a non-transitory computer-readable medium as claimed in claim 1 comprises the steps of:
 identifying a device fingerprint associated with a specific IP address, wherein the device fingerprint is unique to a specific computing device; and
 classifying the specific IP address as a specific location type based on the device fingerprint.

* * * * *